United States Patent
Nicholson et al.

(10) Patent No.: US 11,741,951 B2
(45) Date of Patent: Aug. 29, 2023

(54) CONTEXT ENABLED VOICE COMMANDS

(71) Applicant: Lenovo (Singapore) Pte. Ltd., Singapore (SG)

(72) Inventors: John Weldon Nicholson, Cary, NC (US); Daryl Cromer, Raleigh, NC (US); Howard Locker, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 136 days.

(21) Appl. No.: 16/282,770

(22) Filed: Feb. 22, 2019

(65) Prior Publication Data

US 2020/0273454 A1 Aug. 27, 2020

(51) Int. Cl.
*G10L 15/22* (2006.01)

(52) U.S. Cl.
CPC ........ *G10L 15/22* (2013.01); *G10L 2015/223* (2013.01)

(58) Field of Classification Search
CPC ............................ G10L 15/22; G10L 2015/223
See application file for complete search history.

(56) References Cited

U.S. PATENT DOCUMENTS

| | | | |
|---|---|---|---|
| 5,664,061 A * | 9/1997 | Andreshak | G06F 3/16 704/231 |
| 5,850,627 A * | 12/1998 | Gould | G10L 15/18 704/231 |
| 6,081,780 A * | 6/2000 | Lumelsky | G10L 13/08 704/260 |
| 7,505,910 B2 * | 3/2009 | Kujirai | G01C 21/3608 704/270.1 |
| 8,219,407 B1 * | 7/2012 | Roy | H04L 12/282 704/275 |
| 8,694,322 B2 * | 4/2014 | Snitkovskiy | G10L 15/22 704/275 |
| 9,443,272 B2 * | 9/2016 | Wan | G06Q 30/0601 |
| 9,548,979 B1 * | 1/2017 | Johnson | H04L 63/0861 |
| 9,946,493 B2 * | 4/2018 | Acedo | G06F 3/0631 |
| 10,372,130 B1 * | 8/2019 | Kaushansky | G05D 1/0088 |
| 2003/0014260 A1 * | 1/2003 | Coffman | G10L 15/22 704/275 |
| 2003/0154077 A1 * | 8/2003 | Tahara | G10L 15/10 704/239 |

(Continued)

*Primary Examiner* — Bhavesh M Mehta
*Assistant Examiner* — Oluwadamilola M Ogunbiyi
(74) *Attorney, Agent, or Firm* — FERENCE & ASSOCIATES LLC

(57) ABSTRACT

One embodiment provides a method, including: detecting, at an input device of an information handling device, voice input; determining, using a processor, whether the voice input corresponds to a voice command; identifying, responsive to determining that the voice input corresponds to a voice command, that the voice command is associated with an enabled voice command; determining, using a processor, whether a characteristic of the voice command corresponds to a predetermined input characteristic; and performing, responsive to identifying that the voice command is associated with the enabled voice command and responsive to determining that the characteristic corresponds to the predetermined input characteristic, an action corresponding to the enabled voice command. Other aspects are described and claimed.

18 Claims, 3 Drawing Sheets

(56) References Cited

U.S. PATENT DOCUMENTS

| | | | |
|---|---|---|---|
| 2006/0092033 A1* | 5/2006 | Hoff | G06F 11/0781 340/679 |
| 2007/0286358 A1* | 12/2007 | Pomerantz | G10L 15/22 379/67.1 |
| 2009/0253463 A1* | 10/2009 | Shin | G10L 17/22 455/563 |
| 2009/0326938 A1* | 12/2009 | Marila | G10L 15/22 704/235 |
| 2010/0214211 A1* | 8/2010 | Dods | G06F 1/1626 345/156 |
| 2010/0312547 A1* | 12/2010 | Van Os | G06F 3/167 704/9 |
| 2013/0182002 A1* | 7/2013 | Macciola | H04N 1/387 345/589 |
| 2014/0006033 A1* | 1/2014 | Jung | G06F 3/038 704/275 |
| 2014/0040746 A1* | 2/2014 | Reich | G10L 15/22 715/728 |
| 2014/0074481 A1* | 3/2014 | Newman | G10L 25/51 704/275 |
| 2014/0108010 A1* | 4/2014 | Maltseff | G09B 5/06 704/235 |
| 2014/0244267 A1* | 8/2014 | Levi | G10L 15/22 704/275 |
| 2014/0257808 A1* | 9/2014 | Gil | G10L 15/22 704/235 |
| 2015/0039317 A1* | 2/2015 | Klein | G10L 15/22 704/275 |
| 2015/0170664 A1* | 6/2015 | Doherty | G08C 17/02 704/275 |
| 2016/0127816 A1* | 5/2016 | Mickelsen | G10L 15/22 381/56 |
| 2016/0182800 A1* | 6/2016 | Kaneko | H04N 5/23203 348/211.4 |
| 2016/0351191 A1* | 12/2016 | Vilermo | G06F 3/167 |
| 2017/0169819 A1* | 6/2017 | Mese | G06F 3/167 |
| 2017/0178632 A1* | 6/2017 | Li | G10L 17/22 |
| 2017/0221336 A1* | 8/2017 | Ogaz | G10L 25/66 |
| 2017/0256256 A1* | 9/2017 | Wang | G10L 15/1822 |
| 2017/0264739 A1* | 9/2017 | Smith | H04M 3/2281 |
| 2018/0041356 A1* | 2/2018 | Janardhanan | H04W 4/20 |
| 2018/0111552 A1* | 4/2018 | Neiswander | B60W 40/09 |
| 2018/0166074 A1* | 6/2018 | Aggarwal | G10L 15/08 |
| 2018/0300421 A1* | 10/2018 | Andreica | G10L 15/26 |
| 2018/0329508 A1* | 11/2018 | Klein | G06F 1/32 |
| 2018/0329512 A1* | 11/2018 | Liao | G06K 9/6254 |
| 2019/0019515 A1* | 1/2019 | Kim | G10L 15/22 |
| 2019/0066674 A1* | 2/2019 | Jaygarl | G06F 3/167 |
| 2019/0156003 A1* | 5/2019 | Alameh | G06F 21/45 |
| 2019/0324553 A1* | 10/2019 | Liu | G06F 16/90332 |
| 2019/0348027 A1* | 11/2019 | Berenzweig | G06N 7/00 |
| 2019/0354177 A1* | 11/2019 | Horiuchi | G06F 3/167 |
| 2019/0378493 A1* | 12/2019 | Kim | G10L 15/25 |
| 2019/0391726 A1* | 12/2019 | Iskandar | G06F 3/011 |
| 2020/0051092 A1* | 2/2020 | D'Souza | G06Q 30/014 |
| 2020/0081753 A1* | 3/2020 | Deluca et al. | G06F 3/165 |
| 2020/0098354 A1* | 3/2020 | Lin | G10L 15/22 |
| 2020/0135191 A1* | 4/2020 | Nourbakhsh | G10L 15/22 |
| 2020/0152191 A1* | 5/2020 | Touyama | G10L 15/10 |
| 2020/0156662 A1* | 5/2020 | Mimura | B60K 35/00 |
| 2020/0175979 A1* | 6/2020 | Lee | G06F 3/04883 |
| 2020/0193991 A1* | 6/2020 | Saito | G06F 3/167 |
| 2020/0219320 A1* | 7/2020 | Moniri | B60K 35/00 |
| 2020/0219491 A1* | 7/2020 | Jarosz | G10L 15/1822 |
| 2020/0259964 A1* | 8/2020 | Mizuta | G06F 3/121 |
| 2020/0379557 A1* | 12/2020 | Wu | G06F 40/166 |

* cited by examiner

CONTEXT ENABLED VOICE COMMANDS

BACKGROUND

Information handling devices ("devices"), for example smart phones, tablets, laptop and personal computers, other electronic devices, and the like, are capable of receiving user input from a variety of different types of input methods. For example, a user may provide input using one or more conventional input techniques such as keyboard input, mouse input, stylus input, etc. Additionally or alternatively, users may also be able to provide input to a device using one or more other natural techniques such as touch input, voice input, gesture input, etc.

BRIEF SUMMARY

In summary, one aspect provides a method, comprising: detecting, at an input device of an information handling device, voice input; determining, using a processor, whether the voice input corresponds to a voice command; identifying, responsive to determining that the voice input corresponds to a voice command, that the voice command is associated with an enabled voice command; determining, using a processor, whether a characteristic of the voice command corresponds to a predetermined input characteristic; and performing, responsive to identifying that the voice command is associated with the enabled voice command and responsive to determining that the characteristic corresponds to the predetermined input characteristic, an action corresponding to the enabled voice command.

Another aspect provides an information handling device, comprising: a processor; an input device; a memory device that stores instructions executable by the processor to: detect voice input; determine whether the voice input corresponds to a voice command; identify, responsive to determining that the voice input corresponds to a voice command, that the voice command is associated with an enabled voice command; determine whether a characteristic of the voice command corresponds to a predetermined input characteristic; and perform, responsive to identifying that the voice command is associated with the enabled voice command and responsive to determining that the characteristic corresponds to the predetermined input characteristic, an action corresponding to the enabled voice command.

A further aspect provides a product, comprising: a storage device that stores code, the code being executable by a processor and comprising: code that detects voice input; code that determines whether the voice input corresponds to a voice command; code that identifies, responsive to determining that the voice input corresponds to a voice command, that the voice command is associated with an enabled voice command; code that determines whether a characteristic of the voice command corresponds to a predetermined input characteristic; and code that performs, responsive to identifying that the voice command is associated with the enabled voice command and responsive to determining that the characteristic corresponds to the predetermined input characteristic, an action corresponding to the enabled voice command.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
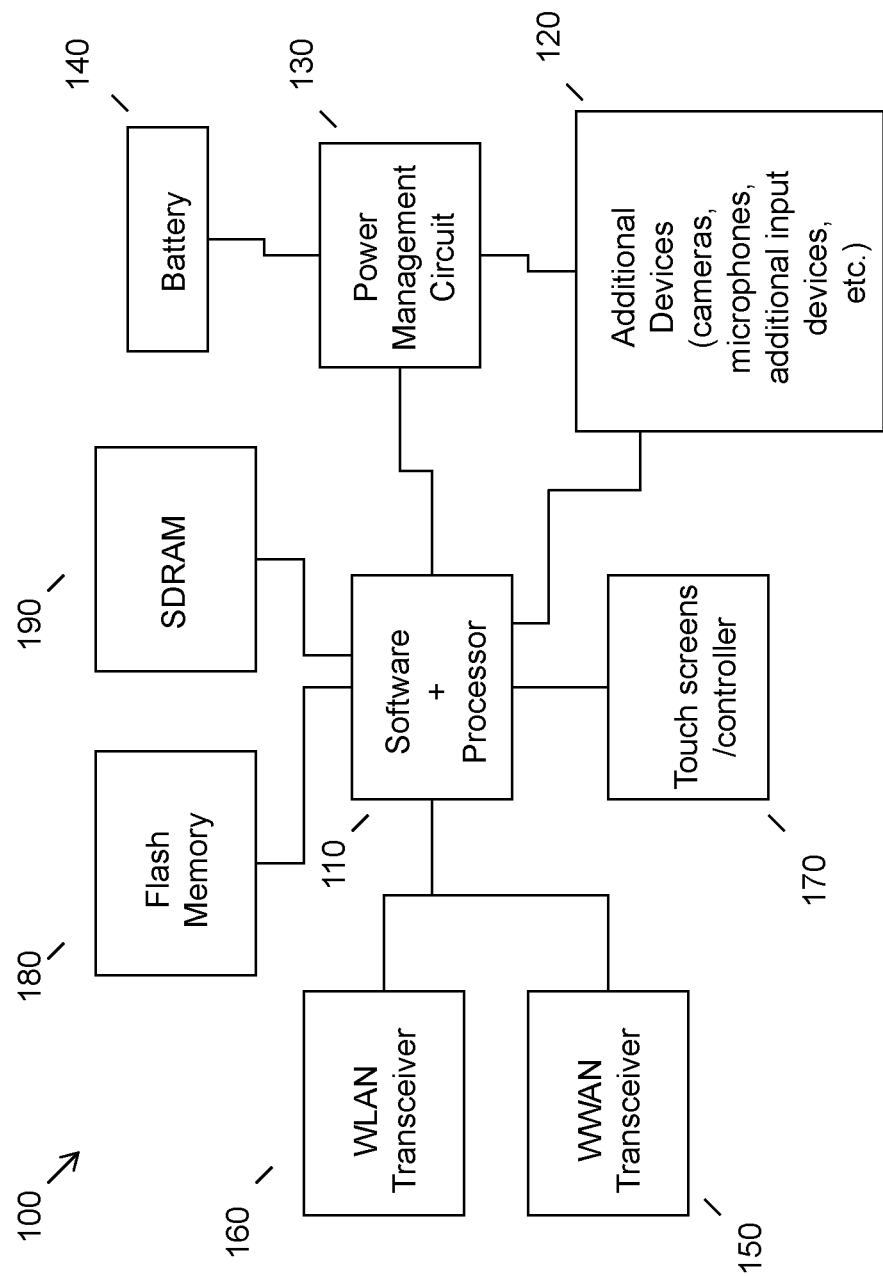
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Advances in technology have enabled users to combine input types when providing input. For example, a user may provide drawing input to an application using a stylus and thereafter change the color of a line being drawn from black to red by providing the voice input "red". Such a technique is beneficial to a user because it negates the requirement to pick up the stylus from the drawing, select a new line color from a menu, and thereafter replace the stylus at the stoppage point. In a similar example, a user may want to type the phrase "It's so much easier using my voice while I type!" In this scenario, a user may begin typing the foregoing phrase using conventional keyboard input and, prior to typing the word "easier", may provide the voice input "italics". The voice input may provide an indication to the system to italicize all subsequent keyboard inputs. After the word "italics" is typed, a user may thereafter provide the voice input "italics" again to unitalicize all subsequent keyboard inputs. Such a technique may create a much smoother and more enjoyable typing experience for the user.

Although the foregoing multi-input techniques may allow a user to create content in a more fluid manner, these techniques still have their drawbacks. For example, a user may inadvertently provide a voice command. For instance, a user may be talking to their dog Red while drawing and say, "fetch the stick, Red". A system may interpret that phrase as an input command and attempt to perform an action corresponding to a recognizable portion of the "command". Accordingly, the system may change the ink color of the drawing to red when the user did not intend to do so. This can be frustrating to a user and burdensome to fix.

Accordingly, an embodiment may determine whether a detected voice input corresponds to an intended voice command enabled for an application. In an embodiment, voice input provided by a user may be detected at an input device (e.g., a microphone, etc.). An embodiment may then determine whether at least a portion of the voice input corresponds to a voice command. Responsive to arriving at a positive determination, an embodiment may then identify whether the voice command is associated with an enabled voice command (e.g., by referring to a list of associations that identify voice commands that are enabled for different applications, by identifying that the voice input was detected during receipt of another, predetermined input type, etc.). Thereafter, in order to determine whether the user intended to use the phrasing in the voice input as an actual command, an embodiment may determine whether a characteristic of the voice command corresponds to a predetermined input characteristic. In an embodiment, the characteristic may be: an audible characteristic of the voice command (e.g., a cadence of the voice command, a speed of the voice command, etc.). Responsive to identifying that the voice command corresponds to an enabled voice command and that the voice command was actually intended to be utilized as a command, an embodiment may perform a corresponding action based on the voice command. Such a method may ensure that a user does not inadvertently provide a voice command while providing another input type to an application.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, motion sensor such as an accelerometer or gyroscope, a thermal sensor, etc. System 100 often includes one or more touch screens 170 for data input and display/rendering. System 100 also typically includes various memory devices, for example flash memory 180 and SDRAM 190.

Figure 2:
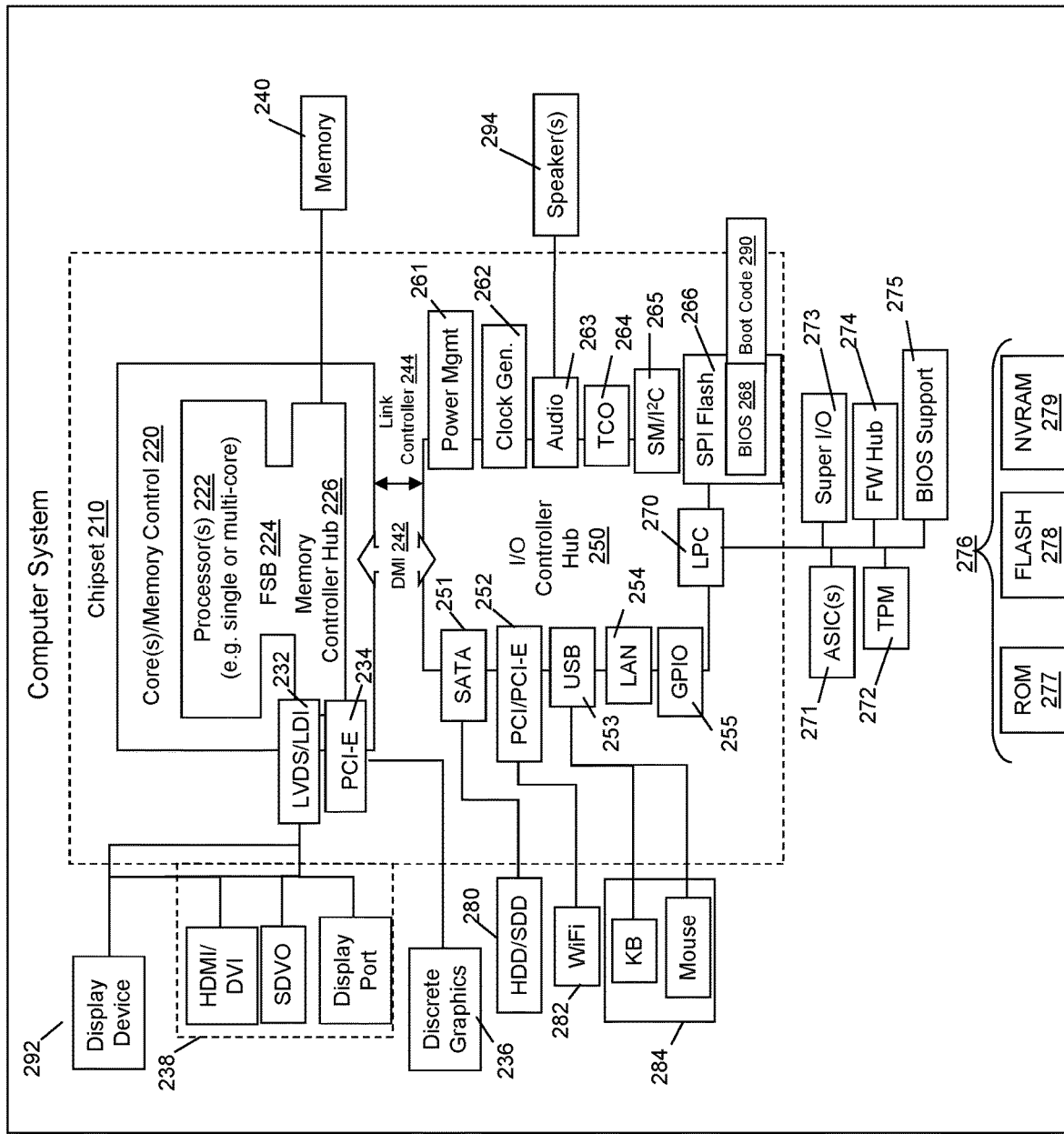
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, laptops, televisions, personal computer devices generally, and/or electronic devices that are capable of accepting multiple input types substantially simultaneously. For example, the circuitry outlined in FIG. 1 may be implemented in a tablet or smart phone embodiment, whereas the circuitry outlined in FIG. 2 may be implemented in a laptop.

Figure 3:
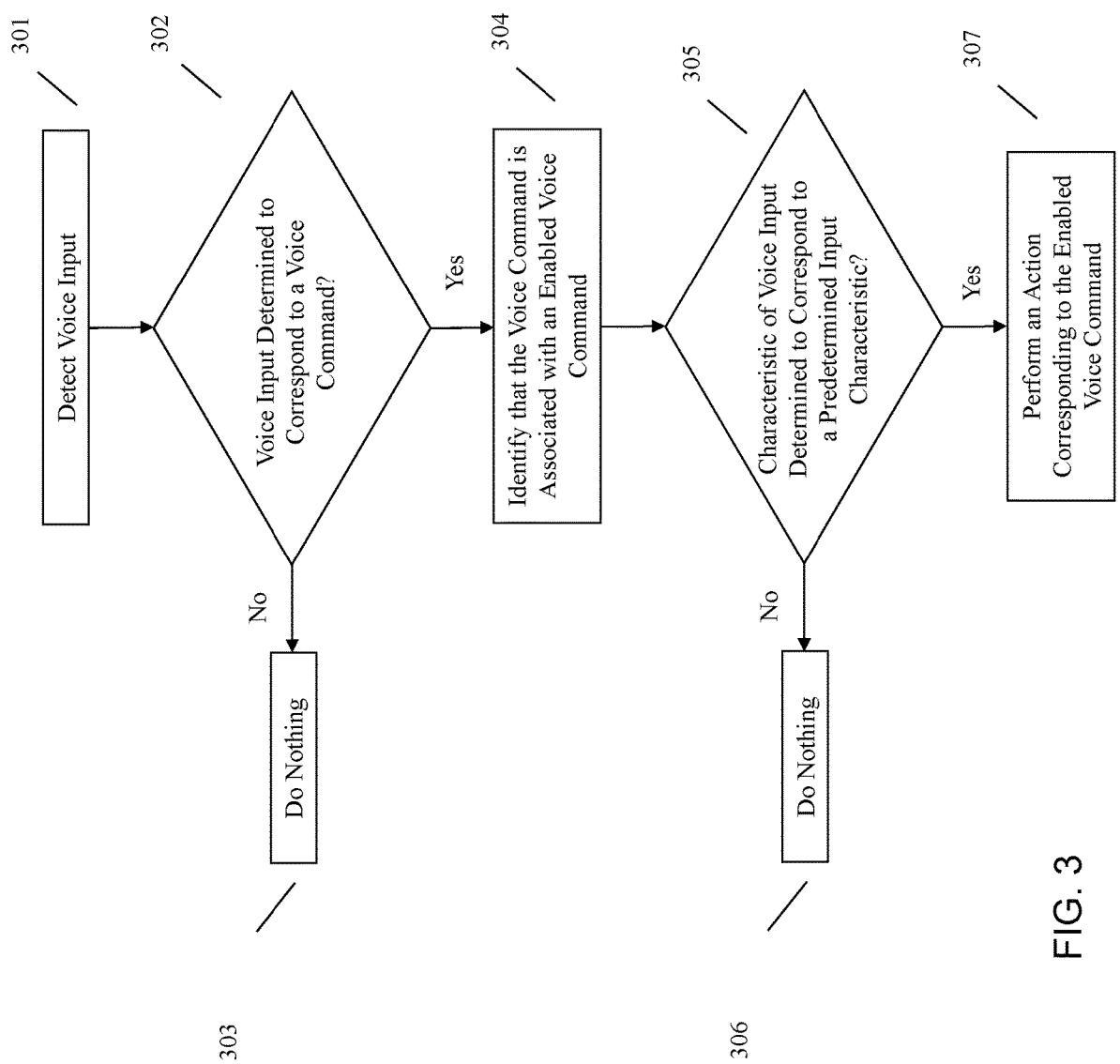
FIG. 3 illustrates an example method of contextually enabling voice commands.

Referring now to FIG. 3, an embodiment may determine whether a detected voice input corresponds to an intended voice command enabled for an application. At 301, an embodiment may detect voice input at a device. The voice input may be detected by using one or more audio capture devices (e.g., one or more microphones, etc.) integrally or operatively coupled to the device. In an embodiment, the audio capture devices may be always-on or, alternatively, may be powered on responsive to receiving an indication that voice input is forthcoming (e.g., a user is interacting with the device via another input means, a user is a predetermined distant from the device, a user is looking at the device, etc.).

At 302, an embodiment may determine whether at least a portion of the voice input corresponds to a voice command. In an embodiment, the determination may involve identifying that at least a portion of the voice input comprises a known command word or phrase. An embodiment may make this determination by accessing a list of associations between voice inputs and voice commands and thereafter determining whether at least a portion of the voice input corresponds to an association in the list. For example, if a voice input comprises the phrase "change to red", or an equivalent thereof such as "red" or "red pen", and an embodiment identifies that a voice command comprises the same or substantially similar phrase, an embodiment may conclude that the voice input is associated with a voice command. In an embodiment, the list of associations may be stored locally (e.g., on the device, etc.) or may be stored remotely (e.g., on another device, another server, etc.) and accessed using a wired or wirelessly connection.

Responsive to determining, at 302, that at least a portion of the voice input is not associated with a voice command, an embodiment may, at 303, do nothing. Conversely, responsive to determining, at 302, that at least a portion of the voice input is associated with a voice command, an embodiment may, at 304, attempt to identify that the voice command is associated with an enabled voice command. In the context of this application, an enabled voice command may be voice input recognized by the system as directing the device, or application on the device, to perform a predetermined action. Additionally, the enabled voice command may correspond to a plurality of, or a set of, enabled voice commands. The following paragraphs describe a plurality of different identification methods. These methods may be used alone, or in combination, to identify whether the voice input is associated with an enabled voice command.

In an embodiment, the identification may involve identifying that the voice input is associated with a predetermined application. More particularly, certain commands may only be enabled when provided to a particular application or application type. For example, the voice command "A3" may only be enabled when provided to a spreadsheet-type application. In another example, the voice command "change to red" or "red" may only be enabled when provided to a drawing or image-editing application. An embodiment may consider the voice input is associated with an enabled voice command responsive to simply identifying that the predetermined application is open (e.g., in the background, etc.). Alternatively, in another embodiment, the voice input may be considered to be associated with an enabled voice command responsive to identifying that the predetermined application is a currently focused application. For example, an embodiment may identify that the predetermined application has an active cursor, is a top-level application window, is currently receiving other types of user input, a combination thereof, and the like. In a situation where an active window and/or multiple background windows support the same voice command, an embodiment may first perform a function associated with the voice command in the active window if the active window supports the voice command. Alternatively, if an active window does not support the voice command, an embodiment may identify which of the background windows support the voice command and thereafter perform a function associated with the voice command in the most recently active/utilized background window.

In another embodiment, the identification may involve identifying that the voice input was detected during receipt of another predetermined input type. As a non-limiting example, the voice command "bold" may only be enabled when a user is providing typing input (e.g., using a keyboard, etc.) or drawing input (e.g., using a finger, stylus, etc.). Similarly, in another non-limiting example, the voice command "change to red" or "red" may only be enabled when a user is providing drawing input or typing input. It is important to note that embodiments of the foregoing are not strictly limited to receiving the voice input exactly when a user is also providing another input type. Although that may be the case in certain circumstances, other situations may exist where the other input type is considered as being received without a user actively providing input via the other input type during receipt of the voice command. For instance, typing input may be considered as being received if a user has typed a word within a predetermined threshold of time (e.g., within 5 seconds, etc.), a cursor in an application is blinking, a combination thereof, and the like.

At 305, an embodiment may determine whether a characteristic of the voice command corresponds to a predetermined input characteristic. In the context of this application, a predetermined input characteristic may refer to a characteristic associated with voice input that provides an indication to the system that the voice input is being utilized as a command. For example, embodiments described herein may allow a system to detect the voice input "red" and distinguish between a user who wanted to change a line color to red and a user who was calling for their dog, Red.

In an embodiment, the characteristic of the voice command and/or the predetermined input characteristic may correspond to an audible characteristic. For example, in an embodiment, the audible characteristic may be associated with a cadence of the voice command. As used herein, a cadence may be associated with the rhythmic flow of a sequence of sounds or words. The rhythmic flow may comprise particular modulations or inflections of a user's voice, pauses in between words and/or phrases, etc. Additionally, a predetermined input cadence may be a cadence with which input is provided to a device that is associated with an intention to provide input.

An embodiment may determine that a characteristic of the voice command corresponds to a predetermined input characteristic by identifying that the cadence of the voice command corresponds to a predetermined input cadence. More particularly, an embodiment may identify that the voice command comprises substantially the same inflections, modulations, and/or pauses as other types of commands known to be associated with users wanting to provide command input to a device. These other types of commands may be stored in a local or remote database and may be accessed by a wired or wireless connection. As an example of the foregoing, if a device receives the voice input "red" with identifiable pauses of a predetermined length (e.g., 2 seconds, 3 seconds, etc.) before and after the input, an embodiment may conclude that the user was attempting to provide the input as a command. Conversely, if a device receives the voice input "fetch the stick, Red", an embodiment may conclude that the voice input was not intended to be provided as a command because the voice input does not contain the aforementioned pauses and/or other audio characteristics known to be associated with inputs intended to be provided as commands. In a similar embodiment, an embodiment may determine that a characteristic of the voice command corresponds to a predetermined input characteristic by identifying that the speed of the voice command corresponds to a predetermined input speed. Stated differently, an embodiment may be able to access a listing of commands received at speeds known to be associated with users wanting to provide a command and determine whether the voice input was provided at substantially the same speed.

Responsive to identifying, at 304, that the voice command is associated with an enabled voice command and responsive to determining, at 305, that the characteristic of the voice command corresponds to the predetermined input characteristic, an embodiment may, at 307, perform an action corresponding to the enabled voice command. In an embodiment, the action may be performed on content in an application, in multiple applications, at a system wide level, etc. Additionally or alternatively, an embodiment may validate that they have received the voice command and are performing a corresponding action. For example, if a user provides the enabled command "red" an embodiment may provide the validation response "switching to red pen". However, responsive to identifying, at 304, that the voice command is not associated with an enabled voice command and/or that the characteristic of the voice command does correspond to a predetermined input characteristic, an embodiment may, at 306, do nothing. Alternatively, an embodiment may output a notification to a user that one or both of the foregoing criteria have not been met. The notification may comprise a query asking the user if they were attempting to provide input and, if the user provides an affirmative response, may instruct the user to try again and/or may instruct the user on how better to provide the intended command.

The various embodiments described herein thus represent a technical improvement to conventional voice command provision techniques. Using the techniques described herein, an embodiment may first detect voice input and thereafter determine whether the voice input corresponds to a voice command. Responsive to determining that the voice input does correspond to a voice command, an embodiment may identify whether the voice command is associated with an enabled voice command and an embodiment may also determine whether a characteristic of the voice command corresponds to a predetermined input characteristic. Responsive to arriving at a positive determination for the foregoing criteria, an embodiment may perform an action corresponding to the enabled voice command. Such a method may ensure that voice input detected by the device actually corresponds to command input intended to be provided to the device by a user.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    detecting, at an input device of an information handling device, voice input from a user, wherein the voice input was detected during receipt of input having another input type other than voice;
    determining the voice input corresponds to a voice command by accessing a list of associations between voice inputs and voice commands and determining that the voice input is substantially similar to one of the voice commands;
    identifying, responsive to determining the voice input corresponds to a voice command, the voice command is associated with an enabled voice command of an open application that is associated with an actionable function by the open application, wherein the voice command is different from an enabled voice command executable by an active application of a plurality of open applications;
    determining the user intended to perform the actionable function corresponding to the enabled voice input within the active application using the voice input by determining a characteristic of the voice command corresponds to a predetermined input characteristic corresponding to a cadence of the voice input and associated with a predetermined input cadence of the enabled voice commands; and
    performing, responsive to identifying the voice command is associated with the enabled voice command and that the characteristic corresponds to the predetermined input characteristic, the actionable function corresponding to the enabled voice command, wherein the actionable function modifies the input having another input type.

2. The method of claim 1, wherein the determining whether the voice input corresponds to a voice command comprises:
    accessing a list of associations between voice inputs and voice commands; and
    thereafter determining whether at least a portion of the voice input corresponds to an association in the list.

3. The method of claim 1, wherein the identifying comprises identifying that the voice command is associated with the active application.

4. The method of claim 1, wherein the identifying comprises identifying that the voice command was detected during receipt of another, predetermined input type.

5. The method of claim 1, wherein the enabled voice command comprises a set of enabled voice commands.

6. The method of claim 1, wherein the characteristic of the voice command corresponds to an audible characteristic.

7. The method of claim 6, wherein the audible characteristic is associated with a speed of the voice command and wherein the predetermined input characteristic is associated with a predetermined input speed.

8. The method of claim 1, wherein the predetermined input cadence comprises a pause at one or more predetermined points in the voice command.

9. The method of claim 1, further comprising notifying, responsive to determining that the characteristic does not correspond to the predetermined input characteristic, a user.

10. An information handling device, comprising:
    a processor;
    an input device;
    a memory device that stores instructions executable by the processor to:
    detect voice input from a user, wherein the voice input was detected during receipt of input having another input type other than voice;
    determine the voice input corresponds to a voice command by accessing a list of associations between voice inputs and voice commands and determining that the voice input is substantially similar to one of the voice commands;
    identify, responsive to determining the voice input corresponds to a voice command, the voice command is associated with an enabled voice command of an open application that is associated with an actionable function by the open application, wherein the voice command is different from an enabled voice command executable by an active application of a plurality of open applications;
    determine the user intended to perform the actionable function corresponding to the enabled voice input within the active application using the voice input by determining a characteristic of the voice command corresponds to a predetermined input characteristic corresponding to a cadence of the voice input and associated with a predetermined input cadence of the enabled voice commands; and
    perform, responsive to identifying the voice command is associated with the enabled voice command and that the characteristic corresponds to the predetermined input characteristic, the actionable function corresponding to the enabled voice command, wherein the actionable function modifies the input having another input type.

11. The information handling device of claim 10, wherein the instructions executable by the processor to determine whether the voice input corresponds to a voice command comprise instructions executable by the processor to:
    access a list of associations between voice inputs and voice commands; and
    thereafter determine whether at least a portion of the voice input corresponds to an association in the list.

12. The information handling device of claim 10, wherein the instructions executable by the processor to identify comprise instructions executable by the processor to identify that the voice command is associated with the active application.

13. The information handling device of claim 10, wherein the instructions executable by the processor to identify comprise instructions executable by the processor to identify that the voice command was detected during receipt of another, predetermined input type.

14. The information handling device of claim 10, wherein the enabled voice command comprises a set of enabled voice commands.

15. The information handling device of claim 10, wherein the characteristic of the voice command corresponds to an audible characteristic.

16. The information handling device of claim 15, wherein the audible characteristic is associated with a speed of the voice command and wherein the predetermined input characteristic is associated with a predetermined input speed.

17. The information handling device of claim 10, wherein the predetermined input cadence comprises a pause at one or more predetermined points in the voice command.

18. A product, comprising:
  a storage device that stores code, the code being executable by a processor and comprising:
  code that detects voice input from a user, wherein the voice input was detected during receipt of input having another input type other than voice;
  code that determines the voice input corresponds to a voice command by accessing a list of associations between voice inputs and voice commands and determining that the voice input is substantially similar to one of the voice commands;
  code that identifies, responsive to determining the voice input corresponds to a voice command, the voice command is associated with an enabled voice command of an open application that is associated with an actionable function by the open application, wherein the voice command is different from an enabled voice command executable by an active application of a plurality of open applications;
  code that determines the user intended to perform the actionable function corresponding to the enabled voice input within the active application using the voice input by determining a characteristic of the voice command corresponds to a predetermined input characteristic corresponding to a cadence of the voice input and associated with a predetermined input cadence of the enabled voice commands; and
  code that performs, responsive to identifying the voice command is associated with the enabled voice command and that the characteristic corresponds to the predetermined input characteristic, the actionable function corresponding to the enabled voice command, wherein the actionable function modifies the input having another input type.

* * * * *